United States Patent [19]
Young

[11] Patent Number: 5,675,901
[45] Date of Patent: Oct. 14, 1997

[54] SEGMENTED, COMBINATION LEVEL AND SQUARE HAVING A ROTATING JOINT

[76] Inventor: James D. Young, 3 W. Cove Rd., Weaverville, N.C. 28787

[21] Appl. No.: 521,109

[22] Filed: Aug. 29, 1995

[51] Int. Cl.⁶ .................................................. B43L 7/10
[52] U.S. Cl. ........................ 33/451; 33/465; 33/452
[58] Field of Search ................... 33/451, 418, 422, 33/423, 424, 452, 456, 459, 465, 468, 469, 471

[56] References Cited

U.S. PATENT DOCUMENTS

| | | | |
|---|---|---|---|
| 649,422 | 5/1900 | Fry et al. | 33/451 |
| 704,369 | 7/1902 | Pritt | 33/451 |
| 1,268,711 | 6/1918 | Griffiths | 33/469 |
| 4,745,689 | 5/1988 | Hiltz | 33/451 |
| 5,020,233 | 6/1991 | Syken | 33/418 |
| 5,461,794 | 10/1995 | Huang | 33/418 |

FOREIGN PATENT DOCUMENTS

3327556  2/1985  Germany ........................ 33/451

*Primary Examiner*—Christopher W. Fulton
*Attorney, Agent, or Firm*—Brian D. Voyce

[57] ABSTRACT

The present invention relates to a segmented, combination level and square that has a rotating joint. In a preferred embodiment, this hand tool provides the user with many optional tools in one. The tool can be configured as a level, a T-square, a framing square, a T-bevel, or a pocket square. In a preferred embodiment, this multi-segmented combination tool also provides the user with a convenient way not only to configure a level, in one inch increments, to any length from several inches to at least ten feet in length, but also to create more than one tool at a time such as a T-level and a framing square. In other preferred embodiments, the user is provided with optional features that enable them to carry on-site a single tool that can perform all tasks needed to do general construction layout such as roof framing.

21 Claims, 8 Drawing Sheets

SEGMENTED, COMBINATION LEVEL AND SQUARE HAVING A ROTATING JOINT

TECHNICAL FIELD

The present invention relates to a segmented, combination level and square that has a rotating joint. In a preferred embodiment, this hand tool provides the user with many optional tools in one. The tool can be configured as a level, a T-square, a framing square, a T-bevel, or a pocket square. In a preferred embodiment, this multi-segmented combination tool also provides the user with a convenient way not only to configure a level, in one inch increments, to any length from several inches to at least ten feet in length, but also to create more than one tool at a time such as a T-level and a framing square. In other preferred embodiments, the user is provided with optional features that enable them to carry on-site a single tool that can perform all tasks needed to do general construction layout such as roof framing.

BACKGROUND ART

In the past, a person doing construction layout work had to carry a number of hand tools to the work site. At least one marked, straight edge level was necessary to determine the level of the work, as well to serve as a rule or straight edge. Most workers carry more than one, depending upon the degree of accuracy and the work space available. A framing square enabled one to set pitchs. An offset T-square was used to mark and cut gypsum board. A bevel assisted in setting angles. A pocket square enabled one to determine and mark perpendiculars. Thus, if the worker had to climb a ladder to a roof being built, they had to carry at least five different tools with him. Usually more than one trip was involved.

SUMMARY OF THE INVENTION

The present invention relates to a segmented, combination level and square that has a rotating joint means. This hand tool provides the user with several optional tools in one. With the rotating joint means set to zero degrees between a first level segment and a second level segment, the tool is a straight level. Change the rotating joint means setting to ninety degrees, and it is a framing square. In between, the tool is a bevel. Separate two segments and reassemble one segment into an offset T-square joint means disposed on the other segment, the tool is an offset T-square. Level segments can vary in length such that smaller level segments are the length of conventional torpedo levels and they can be combined to form a pocket square. Thus, the present invention can offer the worker one tool to carry up a ladder to perform the work of at least five ordinary hand tools.

The segmented combination tool is comprised of at least a first level segment and a second level segment connected by a rotating joint means. The first level segment has at least a first straight surface, a distal end, a proximal end and a level indicating means disposed thereon with respect to the straight surface. The second level segment has at least a first straight surface which is oriented in the same plane as the first straight surface of the first level segment, a distal end, and a proximal end. Typically, each level segment has a rectangular cross section having straight surfaces on the top, bottom and lateral exterior sides. The rotating joint means is disposed between the proximal end of the first level segment and the proximal end of the second level segment. The rotating joint connects the first level segment and second level segment such that the first straight surfaces thereon can form an angular relationship from zero degrees up to ninety degrees.

If desired, the present invention can function not only as a combination level and square, but also as an offset T-square. In such cases, the rotating joint means is dimensioned and configured such that the second level segment can be separated from the first level segment. In addition, the second level segment also has a second straight surface disposed perpendicular to the first straight surface thereon. The first level segment has a T-square joint means disposed about a portion of the first straight surface thereon. The offset T-square joint means is dimensioned and configured to join with the proximal end of the second level segment so as to form an offset right angle between the first straight surface of the first level segment and the second straight surface of the second level segment.

If desired, the present invention can function not only as a combination level and square, but also as a T-square. In such cases, the second level segment is able to be separated from the first level segment. In addition, the first level segment has a T-square joint means disposed about a portion of the first straight surface thereon. The T-square joint means is dimensioned and configured to join with the proximal end of the second level segment so as to form a right angle between the first straight surface of the first level segment and the first straight surface of the second level segment.

PREFERRED EMBODIMENTS

Figure 1:
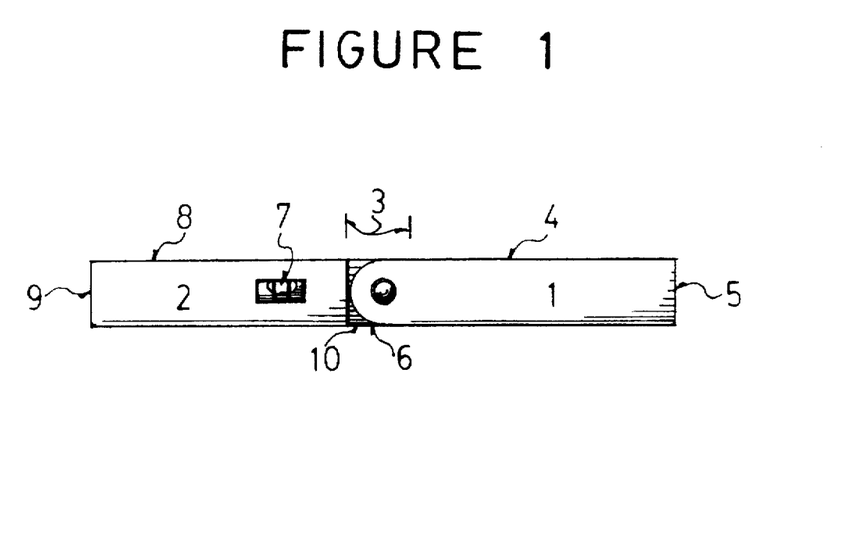
FIG. 1 is a sectional view of an embodiment of the present combination tool as set up to function as a straight level.
Figure 2:
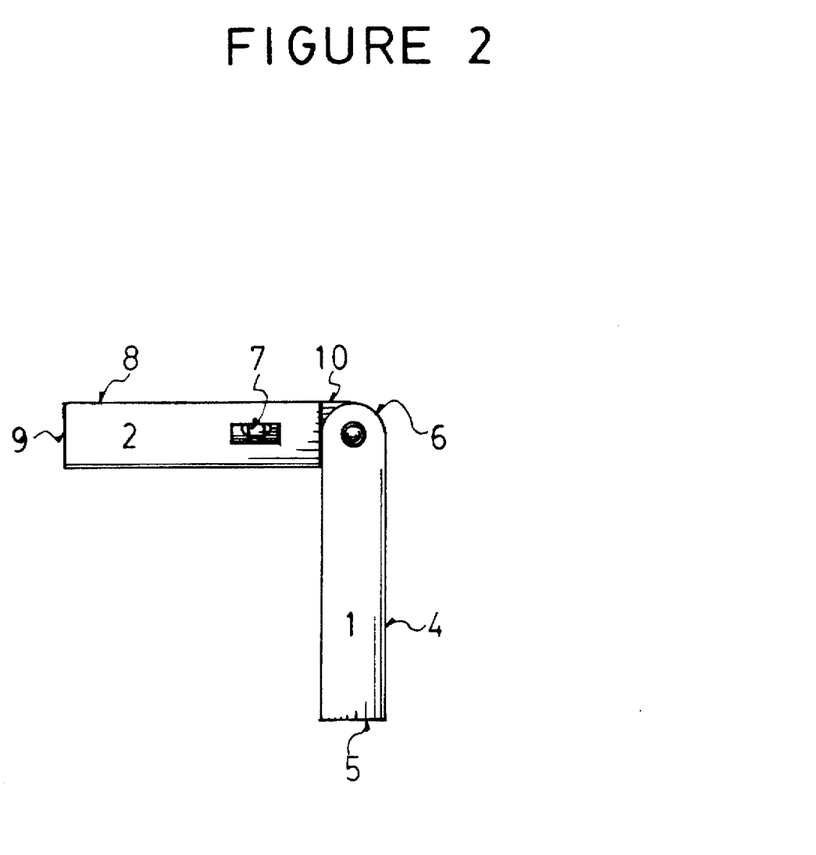
FIG. 2 is a sectional view of an embodiment of the present combination tool as set up to function as a framing square.

A preferred embodiment of the present segmented combination tool is shown in FIG. 1, set up to function as a straight level. The tool is comprised of at least a first level segment (1), a second level segment (2), and a rotating joint means (3) connecting the two segments. The first level segment has at least a first straight surface (4), a distal end (5), and a proximal end (6). A level indicating means (7), such as a spirit level can be attached either to the second level segment, as shown in FIG. 1, or to the first level segment by conventional means, disposed thereon with respect to the first straight surface. The second level segment has at least a first straight surface (8) which is oriented in the same plane as the first straight surface of the first level segment, a distal end (9), and a proximal end (10). Typically, the level segments have a rectangular cross-section, as shown, and thus, have top, bottom, and lateral exterior side surfaces which are all straight. The rotating joint means (3) is disposed between the proximal end of the first level segment (6) and the proximal end of the Second level segment (10). The rotating joint means connects the first level segment and second level segment such that the first: straight surfaces thereon can form an angular relationship of from zero degrees up to ninety degrees.

Preferably, the rotating joint means is dimensioned and configured such that the female coupling member and the male coupling member can be separated. The first level segment, having a first portion of the rotating joint means on the proximal end thereof, which is either a male coupling member or a female coupling member, can be detached from the second level segment, having a second portion of the rotating joint means on the proximal end thereof, which is a male coupling member or a female coupling member complementary to the first portion.

As shown in FIG. 1, each level segment has four straight surfaces and a rectangular cross-section. Typically, each level segment would have a width across the top or first straight surface (4) of about one inch to two inches and a height on a lateral exterior surface of about two inches to four inches.

In preferred embodiments, the length of the present combination tool can be adjusted by adding or subtracting additional level segments of varying lengths. Some or all of the level segments can have level indicating means incorporated therein. In such cases, the tool comprises a plurality of level segments, at least two of the level segments being joined by a rotating joint means. The ends of the adjacent level segments which are not joined by a rotating joint means, instead, are joined by a detachable joint means that does not rotate, such as the joint shown in FIG. 10 for protective end caps (56) fitting onto a male or a female coupling member. Of course, one can incorporate rotating joint means between every pair of adjacent level segment ends.

Figure 10:
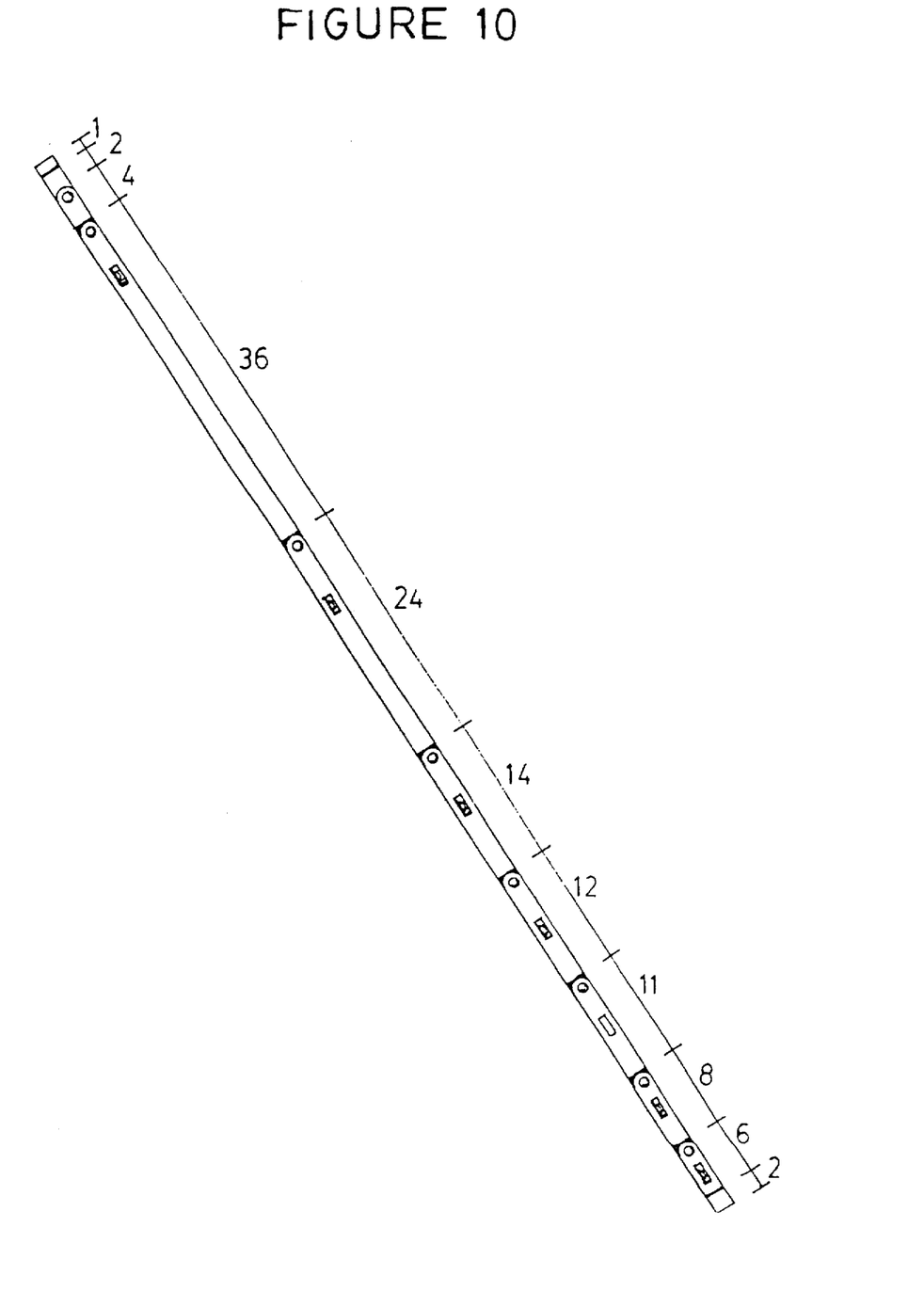
FIG. 10 is a sectional view showing the present invention as a multi-segmented ten foot level with optional preferred features including protective end caps.

The level segments can be selected to have varying lengths that enable the user to construct the present invention in a variety of tool lengths and configurations. For example, if using the English measurement system, the present invention can comprise a ten foot level comprised of eight level segments, with a plurality of level indicating means, as shown in FIG. 10. A first level segment is three feet long. A second level segment is two feet long. A third level segment is fourteen inches long. A fourth level segment is twelve inches long. A fifth level segment is eleven inches long. A sixth level segment is eight inches long. A seventh level segment is six inches long. An eighth level segment is four inches long. Two protective end caps of two inch length are included, as well as one filler end of a one inch length. All but the four inch and the eleven inch level segments have level indicating means. All level segments have a proximal end with a first portion of a separable rotating joint means and a distal end with a complementary second portion of a separable rotating joint means.

Protective end caps (56) and a filler end (57) are installed at the terminal ends of the first and second terminal level segments. As shown in FIG. 10, one protective end cap has a first portion of a detachable non-rotating joint means at the proximal end which can couple with the male coupling member of a rotating joint means disposed on the terminal end of the first terminal level segment, while the other protective end cap has a second portion of a detachable non-rotating joint means at the proximal end which can couple with the complementary female coupling member of the rotating joint means disposed on the terminal end of the second terminal level segment. On the distal ends of the protective end caps are magnets (58) which can attract and hold magnets (59) which are incorporated into the filler ends. Optionally, one can provide a plurality of filler ends in fractional lengths that as steel or magnetic shims can be added onto the protective end caps or other filler ends.

Together these elements form a ten foot level, large enough for the great majority of construction layout tasks. By assembling a lesser number of level segments in varying combinations, one can have a level varying from 6 inches to 10 feet. For storage, the ten foot level can be joined into three separate combinations of level segments, all 40 inches in length.

Figure 3:
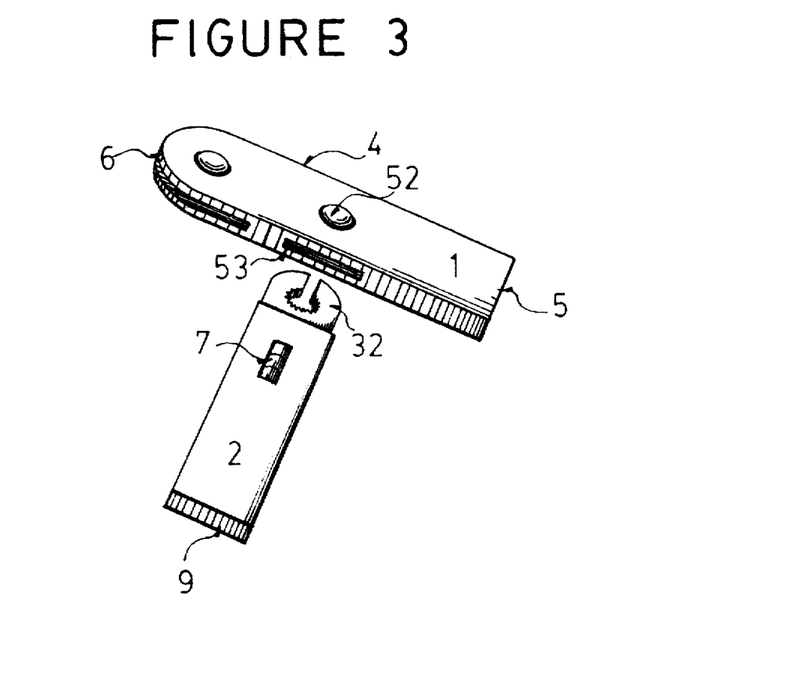
FIG. 3 is an exploded sectional view of an embodiment of the present combination tool as set up to function as a T-square.

The present invention can also be designed to function as a T-square. As shown in FIG. 3, a T-square joint means (52) can be disposed about the first straight surface of the first level segment. The male coupling member (32) of the rotating joint means on the proximal end of the second level segment (2) can be inserted into and joined with the T-square joint means in the first level segment (1) whereby the first straight surface of the first level segment and the first straight surface of the second level segment form a right angle. A preferred T-square joint means has a receiving slot (53) dimensioned and configured to receive the male coupling member in a detachable manner similar to that used in a combination disengaging and angle setting means described below. Alternatively, the receiving slot can comprise a compression fit for the male coupling member.

Figure 4:
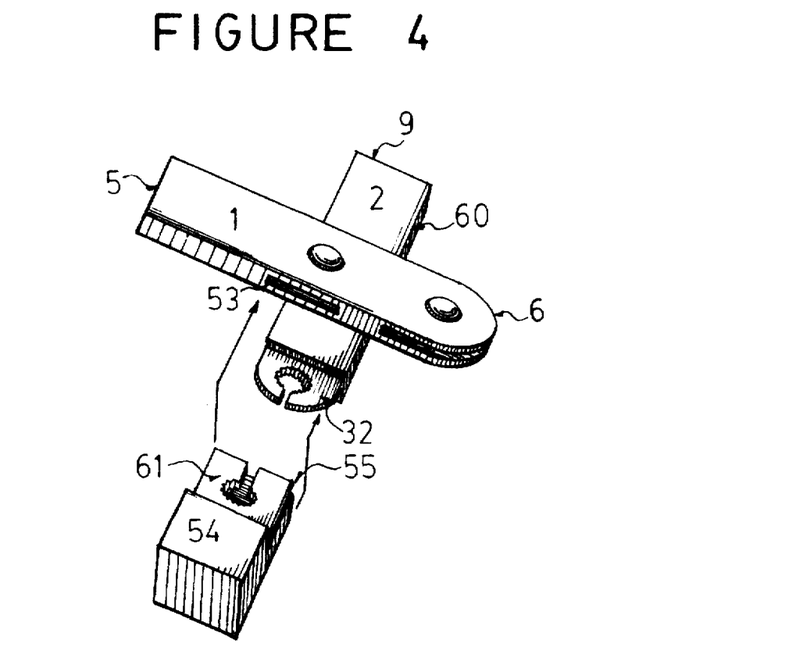
FIG. 4 is a sectional view of an embodiment of the present combination tool as set up to function as an offset T-square.

The present invention can also be designed to function as an offset T-square. As shown in FIG. 4, the second level segment (2) is separable from the first level segment (1). The second level segment also has a second straight surface (60) disposed perpendicular to the first straight surface thereon. The first level segment has an offset T-square joint means (54) disposed about a portion of the first straight surface thereon. The offset T-square joint means is dimensioned and configured to join with the male coupling member (32) on the proximal end of the second level segment so as to form an offset right angle between the first straight surface of the first level segment and the second straight surface of the second level segment.

If desired, the present invention can have a T-square joint means that also serves as part of the offset T-square joint means. In such cases, the offset T-square joint means (54) has a male coupling member (61) that inserts into the T-square receiving slot (55). The offset T-square joint means is dimensioned and configured such that when the male coupling member (61) is received into the T-square receiving slot (53) on the first level segment, the offset T-square joint means also can join with the male coupling member (32) on the proximal end of the second level segment so as to form an offset right angle between the first straight surface of the first level segment and the second straight surface of the second level segment. Alternatively, the offset T-square means can be incorporated into one of the lateral surfaces of a level segment in a unitary fashion.

As shown in FIGS. 5, 6, 7, and 8, a more preferred rotating joint means comprises a detachable male coupling member (32) connected to a female coupling member (11) by a combination disengaging and angle setting means (25) which is disposed about the female coupling member. The rotating joint means is able to establish a predetermined number of angles between the male coupling member and the female coupling member.

Figure 7:
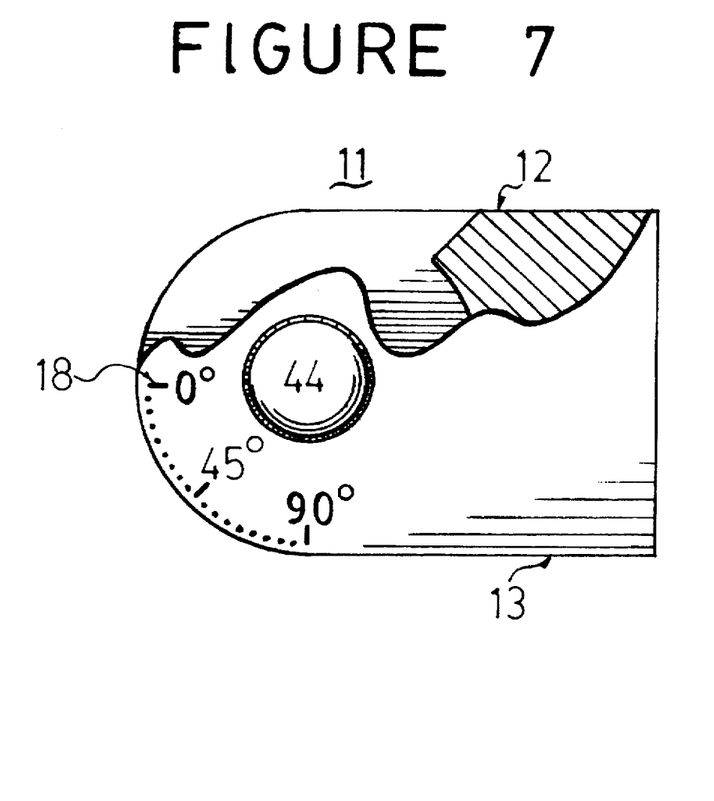
FIG. 7 is a detailed plan view of an embodiment of the rotating joint means portion of the present combination tool, illustrating the separated female coupling member.
Figure 8:
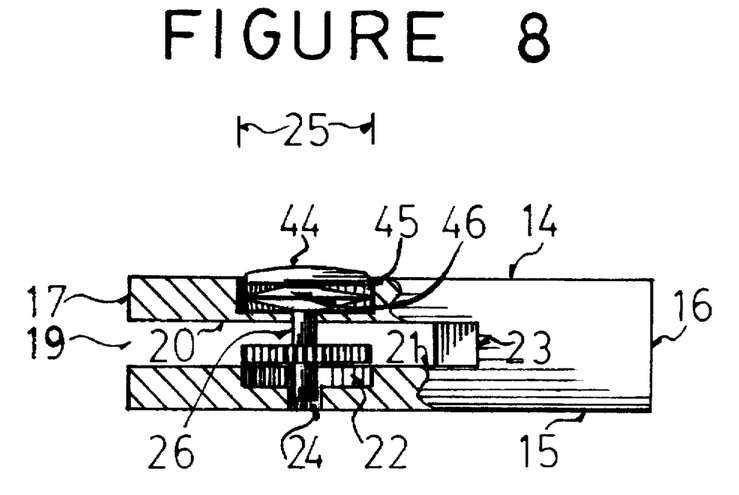
FIG. 8 is a detailed sectional view of the female coupling member shown in FIG. 7, but the female coupling member is not in a position to receive the male coupling member.
Figure 9:
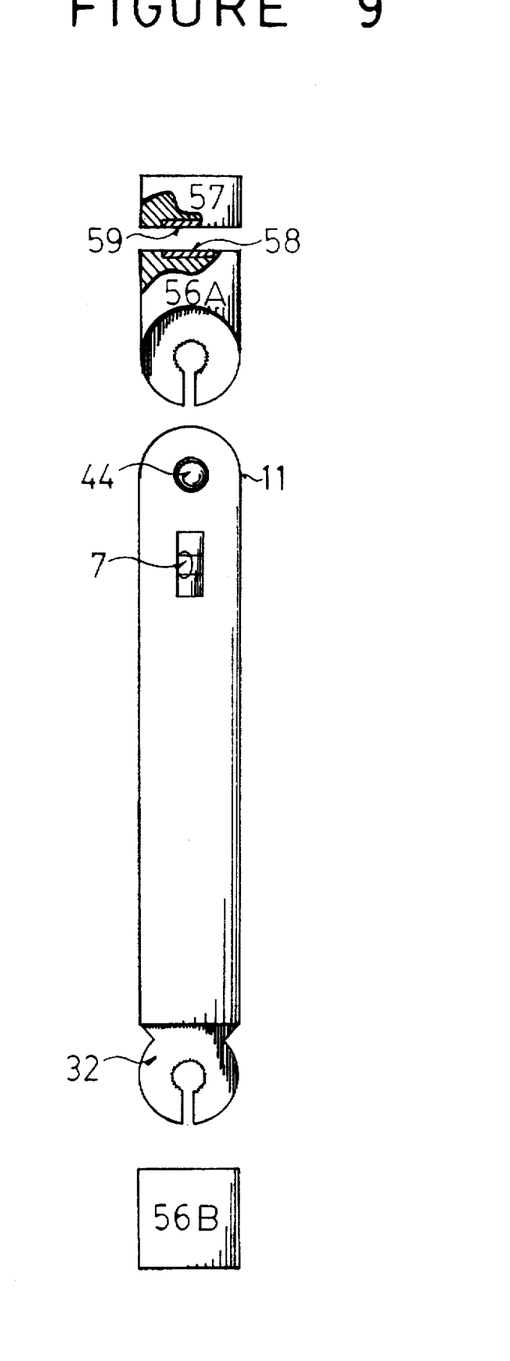
FIG. 9 is a detailed view of the present invention illustrating a protective end cap and a level segment having a female coupling member of a detachable rotating joint means on one end and a male coupling member of a detachable rotating joint means on the other end.

As shown in FIGS. 7 and 8, the female coupling member has a top (12), a bottom (13), a first lateral exterior surface (14), a second lateral exterior surface (15), a distal end (16), and a proximal end (17). The proximal end of the female coupling member is dimensioned and configured so as to form a circular arc of about 180 degrees extending from the top to the bottom. The female coupling member can have a scale (18) disposed about the circumference of the proximal end showing the angles that can be formed by the rotating joint. A receiving slot (19) is disposed about the proximal end, said receiving slot extending vertically from the top to the bottom of the female coupling member, thereby forming a first lateral interior surface (20), a second lateral interior surface (21), and a distal interior surface (23). The distal interior surface is dimensioned and configured to have a circular arc that can function as a bearing race. A shaft opening (24) is disposed horizontally from the first lateral exterior surface through the first lateral interior surface, the receiving slot, and into the second lateral interior surface. (The shaft opening can be extended all the way through to the second exterior surface.) The axis of the shaft opening is within the circle formed by the circular arc on the proximal end, most preferably in a concentric position. Finally, an interior recess (22) is disposed on the second interior surface, said interior recess encompassing the shaft opening.

The combination disengaging and angle setting means (25) disposed about the female coupling member comprises a shaft (26), a spring means (29), and a circular disc (30). The shaft has a distal end (27) and a proximal end (28). The shaft is disposed in the shaft opening and is dimensioned and configured so as to move laterally within the shaft opening (24) and to be within the shaft opening in the first lateral exterior surface (14) and the second lateral exterior surface (15) of the female coupling member. The spring means, such as a spring washer, is disposed about the shaft so as to apply a laterally outward force on the shaft away from the receiving slot and towards the first lateral exterior surface. The circular disc has a plurality of splines (31) disposed about the circumference of the disc in a pattern corresponding to the predetermined angles. The splined disc is connected to the shaft so as to be concentric with the circular arc on the proximal end of the female coupling member. The splined disc is disposed within the receiving slot when no force is applied to the shaft, and is dimensioned and configured such that the splined disc is larger than the shaft opening and is able to be received within the interior recess (22) on the female coupling member. When a force is applied to the shaft, the spring is compressed, and the splined disc is received into the interior recess, only a portion of the shaft remaining in the receiving slot.

Figure 5:
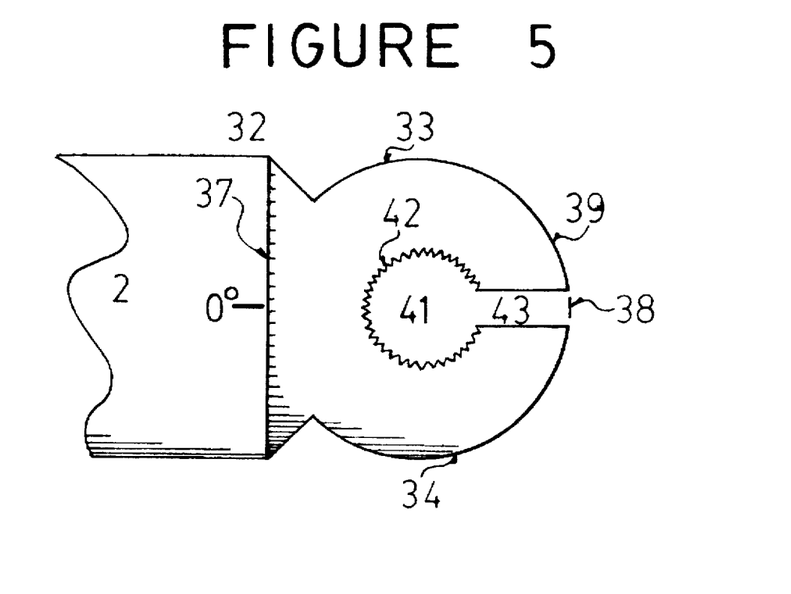
FIG. 5 is a detailed plan view of an embodiment of the rotating joint means portion of the present combination tool, illustrating the separated male coupling member.
Figure 6:
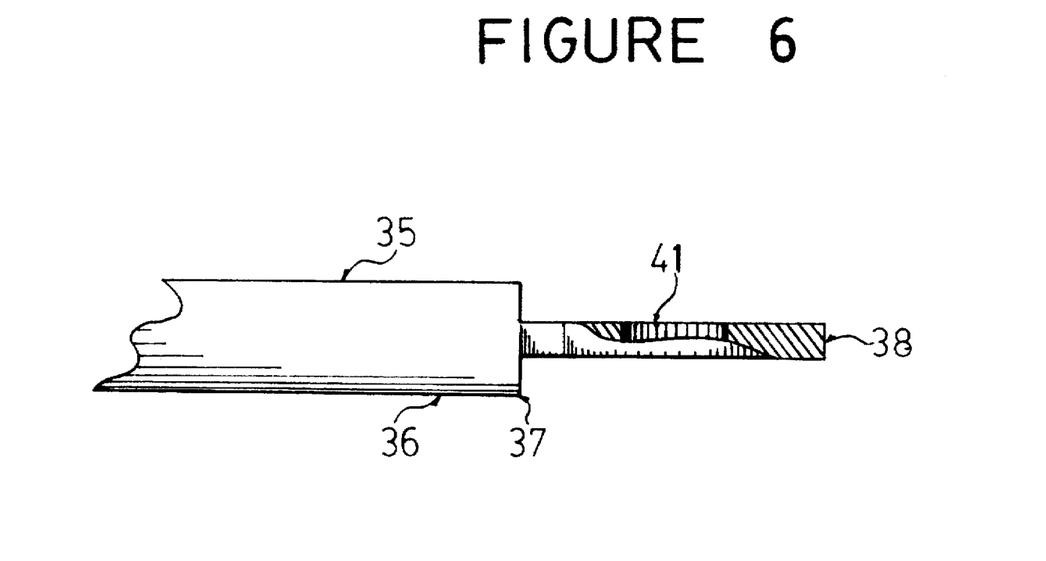
FIG. 6 is a detailed sectional view of the separated male coupling member shown in FIG. 5

As shown in FIGS. 5 and 6, the male coupling member has a top (33), a bottom (34), a first lateral exterior surface (35), a second lateral exterior surface (36), a distal end (37), and a proximal end (38). When forming a rotating joint means, the proximal end of the male coupling member is in a mating relationship with the receiving slot (19) of the female coupling member and the splined disc (30) of the combination disengaging and angle setting means. The proximal end of the male coupling member (38) comprises a circular member (39), a center opening (41), and a shaft slot (43). The circular member is dimensioned and configured so as to be able to be received within the receiving slot (19) of the female coupling member such that a bearing surface is adjacent to the bearing race on the distal interior surface (23) of the receiving slot when a force is applied to the shaft and the splined disc is received within the interior recess. The center opening is disposed concentrically with the circumference of the circular member. The center opening is dimensioned and configured with splines (42) so as to mate with the splined disc in the female coupling member when the proximal end of the male coupling member is in the mating relationship with the female coupling member. The shaft slot (43) extends from the circumference of the circular member to the center opening (41). The shaft slot is dimensioned and configured to be larger than the shaft in the female coupling member (26) so as to allow the circular member to be received within the receiving slot whereby the center opening is concentric with the splined disc.

Although not necessary for the rotating joint means to function, as shown in FIG. 8, the combination disengaging and angle setting means also can comprise an operating button (44) to actuate the shaft (26), and thus the disengaging and angle setting means. In such embodiments, the female coupling member also comprises an exterior recess (45) disposed on the first lateral exterior surface (14), at least a portion of the exterior recess being located about the axis of the shaft opening (24). The combination disengaging and angle setting means also has the operating button connected to the proximal end of the shaft (27). The operating button is dimensioned and configured to be received into the exterior recess when a force is applied to the operating button so as to move the shaft laterally inward. The spring means (29) is disposed about the proximal end of the shaft and interior to the operating button within the exterior recess so as to apply an outward force on either the shaft or the operating button. When an inward force is applied to the operating button such that the operating button is depressed into the exterior recess, the spring is compressed, and the splined disc (30) is received into the interior recess (22), only a portion of the shaft remaining in the receiving slot (19). As shown in FIG. 8, the interior recess, the exterior recess, and the operating button can be centered about the shaft and the shaft opening.

Figure 12:
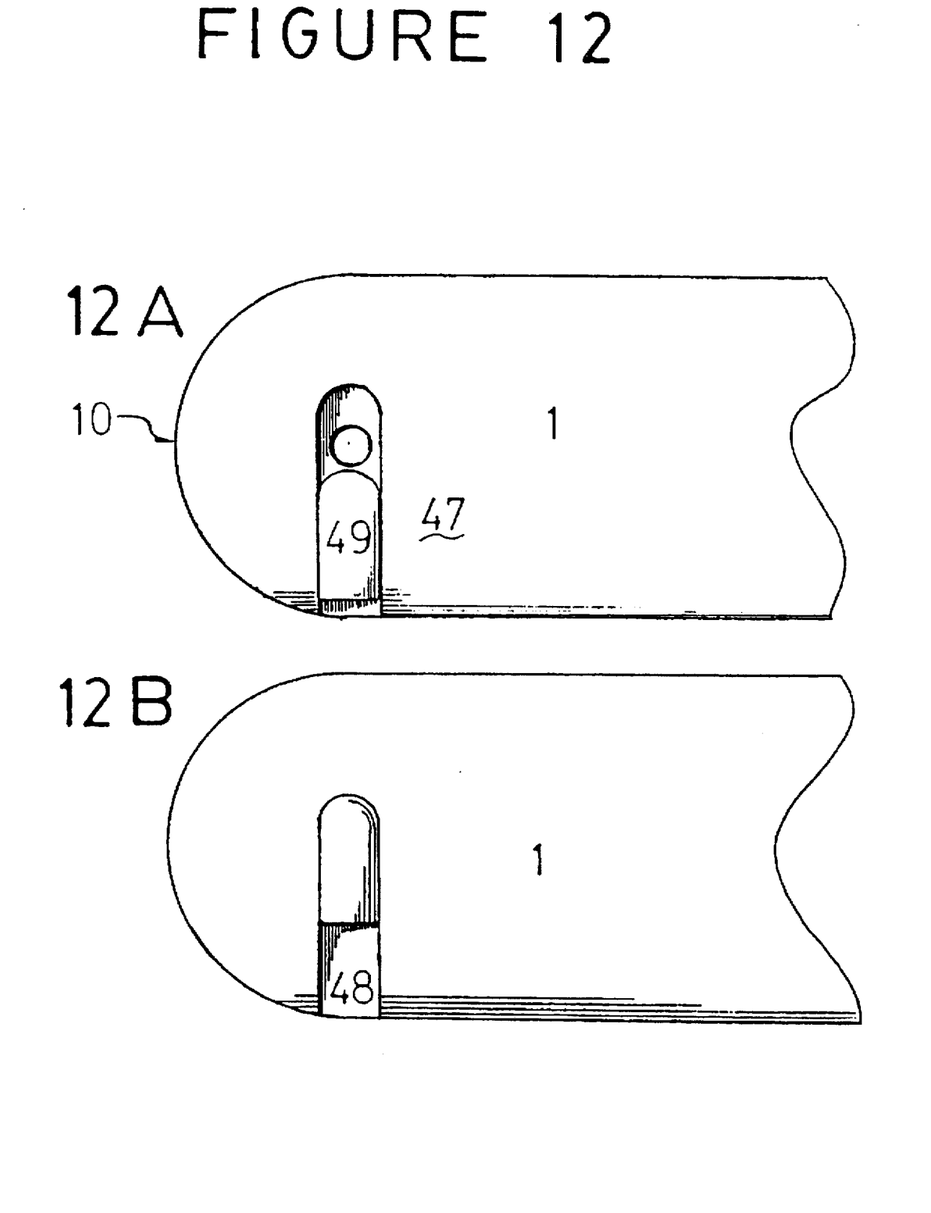
FIGS. 12A and 12B are detailed sectional views of an optional lock-out feature for the combination disengaging and angle setting means in a first position and in a second position.

Optionally, the combination disengaging and angle setting means can also comprise a lock-out means (47) disposed about the female coupling member which in a first position enables the shaft to move laterally so as to allow the splined disc to enter the interior recess, but in a second position prevents the shaft from moving laterally so as to allow the splined disc to enter the interior recess. As shown in FIGS. 12A and 12B, the lock-out means can comprise a second exterior recess (48) and an actuating member (49) disposed in the second exterior recess. The second exterior recess is disposed on the second exterior lateral side (15) of the female coupling member, about the shaft opening (24). The second exterior recess is dimensioned and configured to receive the actuating member and to allow the actuating member to move from a first position, shown in FIG. 12A, which enables the shaft to move laterally so as to allow the splined disc to enter the interior recess, but in a second position, shown in FIG. 12B prevents the shaft from moving laterally so as to allow the splined disc to enter the interior recess.

In a preferred embodiment using the male coupling member shown in FIG. 3, the T-square joint means comprises a T-square receiving slot (53) and a combination disengaging and angle setting means (25) which are similar to that described above and shown in FIGS. 7 and 8. The difference is that unlike the female coupling member in the rotating joint means, the T-square receiving slot is disposed on a straight top or bottom surface of a level segment and presents a planar surface rather than a circular arc. Thus, when the splined disc is moved into the interior recess, the male coupling member of a first level segment is inserted and seated into the T-square receiving slot of a second level segment, and the shaft is allowed to return to a locked position by the spring means. A rigid right angle is formed between the first level segment and the second level segment.

In a preferred embodiment using the male coupling member (61) shown in FIG. 4, the offset T-square joint means comprises an offset T-square receiving slot (55) and a combination disengaging and angle setting means (25) which are similar to that described above and shown in FIGS. 7 and 8. The offset T-square joint means can either be rigidly set for a right angle or it can have an angle setting function. For example, one can have a rotating joint means similar to that described above, including the female coupling member. Alternatively, for a rigid connection, one can have the offset T-square receiving slot which is disposed on a straight surface and does not have a circular arc. Thus, when the splined disc is moved into the interior recess, the male coupling member of a first level segment is inserted and seated into the offset T-square receiving slot disposed on a second level segment, and the shaft is allowed to be returned by the spring means to a locked position, a rigid right angle is formed between the first level segment and the second level segment. In either case, the offset T-square joint means can be either detachably joined to a level segment by conventional means such as threaded fasteners or pin/detent combinations which are part of a unitary construction with the level segment.

Figure 11:
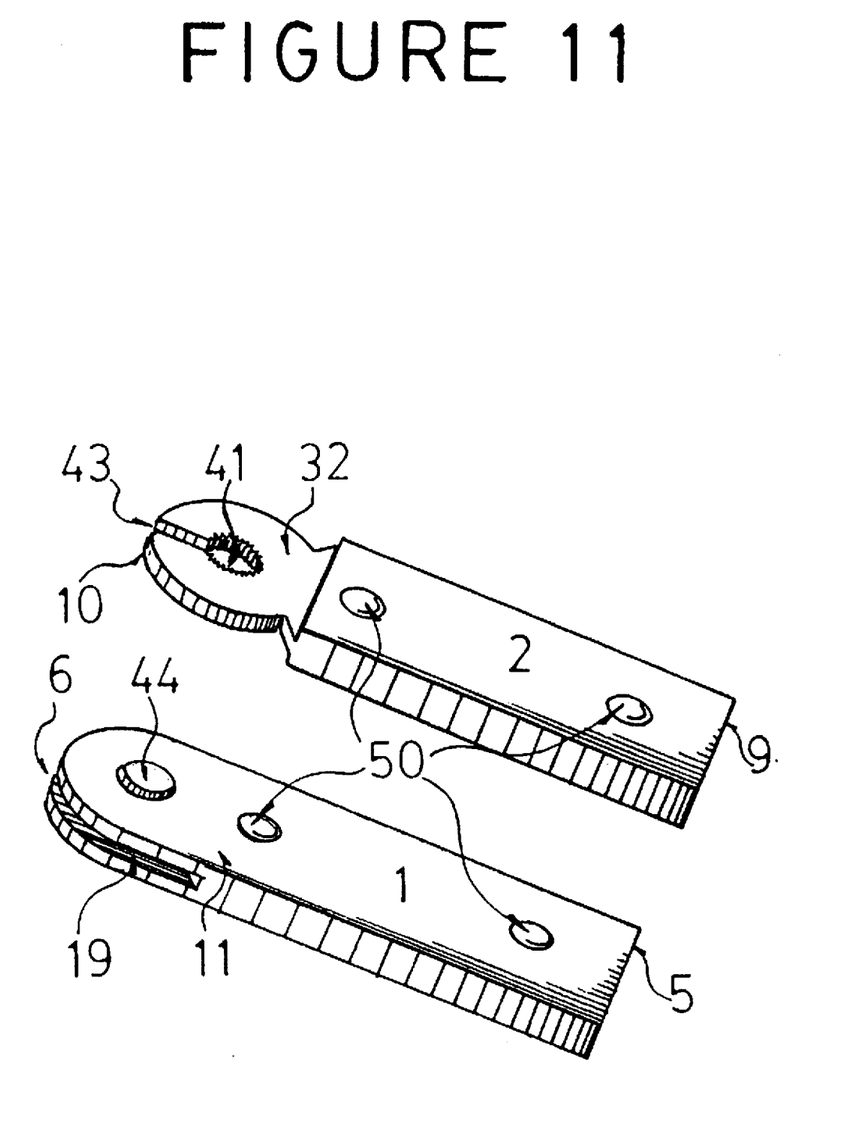
FIG. 11 is an exploded isometric view showing the magnetic storage means for connecting one level segment to another.

In order to facilitate the storing and carrying of the present invention, the level segments preferably have a means of detachably joining the lateral exterior surface of one level segment to the lateral exterior surface of another level segment, other than at the rotating joint means or the detachable joint means on the distal, or proximal ends of the level segments. In a preferred embodiment shown in FIG. 11, permanent magnets (50) are located on lateral exterior surfaces of the level segments. The magnets are located on these surfaces such that when a first lateral exterior surface of a first level segment is placed opposite a first lateral exterior surface of a second level segment, the magnetics poles of the magnets attract and hold the two exterior surface together, thereby forming a magnetic storage means. Rare earth magnets are especially suited to this purpose.

Other optional features that can be incorporated into the present invention include a storage compartment recess built into at least one of the level segments or a pencil sharpener. The storage compartment would have a door (62) that can open and close. The compartment, and the corresponding level segment, could be dimensioned and configured to store a carpenter's pencil. In at least one of the level segments, either a pencil sharpener could be molded therein or a means provided for inserting a conventional pencil sharpener into the level segment. Also, a means for attaching square buttons can be provided for in as many level segments as desired.

The level segments can be machined, molded, extruded, or otherwise constructed from a variety of materials, including conventional hardwood/brass configurations, aluminum, stainless steel, or plastics such as reinforced nylon, delrin, or zytel. The male coupling members and the female coupling members can either be integral with the level segments or be separate parts that are secured to the level segment ends either by fasteners or a snap-on, compression fitting. In a preferred embodiment, the level segments are made by cutting to length from an extruded reinforced plastic length which has had an opening for mounting a spirit level punched out at regular lengths. The female coupling members and the male coupling members are molded plastic.

The ordinarily skilled artisan can appreciate that the present invention can incorporate any number of the preferred features described above.

All publications or unpublished patent applications mentioned herein are hereby incorporated by reference thereto.

Other embodiments of the present invention are not presented here which are obvious to those of ordinary skill in the art, now or during the term of any patent issuing from this patent specification, and thus, are within the spirit and scope of the present invention.

I claim:

1. A detachable rotating joint means comprises a male coupling member connected to a female coupling member by a combination disengaging and angle setting means disposed about the female coupling member, said rotating joint means being able to establish a predetermined number of angles between the male coupling member and the female coupling member, wherein:

a) the female coupling member has a top, a bottom, a first lateral exterior surface, a second lateral exterior surface, a distal end, and a proximal end, wherein;

i) the proximal end is dimensioned and configured so as to form a circular arc of up to about 180 degrees extending from the top to the bottom;

ii) a receiving slot is disposed about the proximal end, said receiving slot extending vertically from the top to the bottom of the female coupling member, thereby forming a first lateral interior surface, a second lateral interior surface, and a distal interior surface, at least a portion of said distal interior surface dimensioned and configured as a circular arc that can function as a bearing race;

iii) a shaft opening is disposed horizontally from the first lateral exterior surface through the first interior lateral surface and into the second lateral interior surface, the axis of the shaft opening being within the circle formed by the circular arc on the proximal end; and         iv) an interior recess is disposed on the second lateral interior surface, said interior recess encompassing the shaft opening;

b) the combination disengaging and angle setting means disposed about the female coupling member comprises:

i) a shaft having a distal end and a proximal end, said shaft being disposed in the shaft opening and being dimensioned and configured so as to move laterally within the shaft opening and to be within the shaft opening in the first lateral exterior surface and the second lateral interior surface;

ii) a spring means disposed about the shaft so as to apply a laterally outward force on the shaft away from the second lateral interior surface and towards the first lateral exterior surface; and         iii) a circular disc having a plurality of splines disposed about the circumference of the disc in a pattern corresponding to the predetermined angles, said splined disc being connected to the shaft so as to be concentric with the circular arc on the proximal end of the female coupling member, being disposed within the receiving slot when no force is applied inwardly to the shaft, and being dimensioned and configured such that the splined disc is larger than the shaft opening and is able to be received within the interior recess;

wherein when an inward force is applied to the shaft, the spring is compressed, and the splined disc is received into the interior recess, only a portion of the shaft remaining in the receiving slot; and c) the male coupling member has a top, a bottom, a first lateral exterior surface, a second lateral exterior surface, a distal end, and a proximal end, wherein the proximal end of the male coupling member is in a mating relationship with the receiving slot and the splined disc of the female coupling member, said proximal end comprising:

i) a circular member, a portion of which forms a bearing surface, said circular member being dimensioned and configured so as to be able to be received within the receiving slot of the female coupling member such that the bearing surface is adjacent to the bearing race on the distal interior surface of the receiving slot when an inward force is applied to the shaft and the splined disc is received within the interior recess;

ii) a center opening disposed concentrically with the circumference of the circular member, said opening being dimensioned and configured with splines so as to mate with the splined disc in the female coupling member when the proximal end of the male coupling member is in the mating relationship with the female coupling member; and iii) a shaft slot extending from the circumference of the circular member to the center opening, said shaft slot being dimensioned and configured to be larger than the shaft in the female coupling member so as to allow the circular member to be received within the receiving slot whereby the center opening is concentric with the splined disc when the inward force is applied to the shaft.

2. The detachable rotating joint means of claim 1 wherein:

a) the female coupling member also comprises an exterior recess disposed on the first lateral exterior surface, at least a portion of the exterior recess being located about the axis of the shaft opening;

b) the combination disengaging and angle setting means also comprises an operating button which is connected to the proximal end of the shaft and which is dimensioned and configured to be received into the exterior recess when a force is applied to the operating button so as to move the shaft laterally inward; and c) the spring means is disposed about the shaft and interior to the operating button within the exterior recess so as to apply on outward force on either the shaft or the operating button;

wherein when an inward force is applied to the operating button such that the operating button is depressed into the exterior recess, the spring is compressed, and the splined disc is received into the interior recess, only a portion of the shaft remaining in the receiving slot.

3. The detachable rotating joint means of claim 1 wherein the interior recess is concentric with the shaft opening.

4. The detachable rotating joint means of claim 2 wherein the interior recess is concentric with the shaft opening.

5. The detachable rotating joint means of claim 1 wherein the distal end of the male coupling member has a means for securing the male coupling member to a member having at least one straight surface.

6. The detachable rotating joint means of claim 1 wherein the distal end of the female coupling member has a means for securing the female coupling member to a member having at least one straight surface.

7. The detachable rotating joint means of claim 6 wherein the distal end of the male coupling member has a means for securing the male coupling member to a member having at least one straight surface.

8. The detachable rotating joint means of claim 1 wherein the combination disengaging and angle setting means also comprises a lock-out means disposed about the female coupling member which in a first position enables the shaft to move laterally, so as to allow the splined disc to enter the interior recess, but in a second position prevents the shaft from moving laterally so as to allow the splined disc to enter the interior recess.

9. The lock-out means of claim 8 comprising a second exterior recess disposed on the second exterior lateral side about the shaft opening and an actuating member disposed in the second exterior recess, said second exterior recess being dimensioned and configured to receive the actuating member and to allow the actuating member to move from a first position which enables the shaft to move laterally so as to allow the splined disc to enter the interior recess, but in a second position prevents the shaft from moving laterally so as to allow the splined disc to enter the interior recess.

10. A level comprised of:

a) at least a first level segment having at least a first straight surface, a distal end, a proximal end, and a level indicating means disposed thereon with respect to the straight surface;

b) a second level segment having at least a first straight surface which is oriented in the same plane as the first straight surface of the first level segment, a distal end, and a proximal end; and c) the rotating joint means of claim 1.

11. The level of claim 10 having an adjustable length comprising a plurality of level segments, at least two of the level segments being joined at adjacent ends by the rotating joint means, the remaining adjacent ends of the level segments being joined by a detachable joint means.

12. The level of claim 11 comprising a plurality of level segments having a first terminal level segment and a second terminal level segment, each terminal level segment having a terminal end.

13. The level of claim 11 also comprising a female coupling member disposed on the terminal end of the first terminal level segment and a male coupling member on the terminal end of the second terminal level segment, a first protective end cap attached to the female coupling member on the terminal and a second protective end cap attached to the male coupling member on the other terminal end, wherein the first protective end cap has at least a first straight surface, a distal end, and a proximal end, the proximal end being dimensioned and configured so as to engage and seat in a non-rotating manner with the female coupling member on the terminal end on the first terminal level segment, and the second protective end cap also has at least a first straight surface, a distal end, and a proximal end, the proximal end being dimensioned and configured so as to engage and seat in a non-rotating manner with the male coupling member on the terminal end on the second terminal level segment.

14. The level of claim 13 wherein the distal ends of the protective end caps have magnets disposed therein for the attachment of a filler end, the filler end comprised, at least in part, of a material which can be attracted to the magnets.

15. The level of claim 10 which can also be used as a T-square, wherein the first level segment has a T-square joint means disposed about a portion of the first straight surface thereon, said T-square joint means being dimensioned and configured to join with the proximal end of the second level segment so as to form a rigid right angle between the first straight surface of the first level segment and the first straight surface of the second level segment.

16. The level of claim 15 wherein the T-square joint means comprises:
   a) a T-square receiving slot being disposed on the first straight surface of the first level segment and extending vertically into the first level segment thereby forming a first lateral interior surface, a second lateral interior surface, and a second distal interior surface, said T-square receiving slot being dimensioned and configured to receive a male coupling member which is disposed on the proximal end of the second level segment, said male coupling member having a splined center opening and a shaft slot disposed on a circular member;
   b) a second shaft opening disposed horizontally from the first lateral exterior surface of the first level segment through the first interior lateral surface of the T-square receiving slot, and into the second lateral interior surface, the axis of the second shaft opening being within the center opening on the circular member on the male coupling member of the second level segment when the male coupling member is inserted into the T-square receiving slot;
   c) an interior recess disposed on the second lateral interior surface, said interior recess encompassing the shaft opening; and
   d) a second disengaging means disposed in the first level segment about the T-square receiving slot, said second disengaging means comprising:
      i) a shaft having a distal end and a proximal end, said shaft being disposed in the shaft opening and being dimensioned and configured so as to move laterally within the shaft opening and to be within the shaft opening in the first lateral exterior surface and the second lateral exterior surface;
      ii) a spring means disposed about the shaft so as to apply a laterally outward force on the shaft away from the receiving slot and towards the first lateral exterior surface of the first level segment; and
      iii) a circular disc having a plurality of splines disposed about the circumference of the disc in a pattern corresponding to the splines on the center opening in the male coupling member of the second level segment, said splined disc being connected to the shaft so as to be concentric with the center opening of the male coupling member of the second level segment when the male coupling member is received within the T-square receiving slot, said splined disc being disposed within the receiving slot when no force is applied to the shaft, and being dimensioned and configured such that the splined disc is larger than the shaft opening and is able to be received within the interior recess;

wherein when a force is applied to the shaft, the spring is compressed, the splined disc is received into the interior recess, only a portion of the shaft remaining in the receiving slot, the male coupling member of the second level segment is inserted and seated into the T-square receiving slot of the first level segment, and the shaft is allowed to be returned by the spring means to a locked position; thereby forming a rigid right angle between the first level segment and the second level segment.

17. The level of claim 15 wherein the T-square joint means, in combination with an offset T-square means, can form an offset T-square wherein the offset T-square joint means comprises:
   a) a male coupling member dimensioned and configured to be received into the T-square receiving slot;
   b) a female coupling member connected to the male coupling member, the female coupling member being dimensioned and configured to join with the male coupling member on the proximal end of the second level segment so as to form an offset right angle between the first straight surface of the first level segment and the second straight surface of the second level segment; and
   c) a disengaging means disposed about the female coupling member in the offset T-square means, said disengaging means being dimensioned and configured to release the male coupling member of the second level segment in a first position or secure the male coupling member of the second level segment to the female coupling member in a second position.

18. The level of claim 10 which can also be used as an offset T-square wherein:
   a) the second level segment also has a second straight surface disposed perpendicular to the first straight surface thereon; and
   b) the first level segment has an offset T-square joint means disposed about a portion of the first straight surface thereon, said offset T-square joint means being dimensioned and configured to join with the proximal end of the second level segment so as to form an offset right angle between the first straight surface of the first level segment and the second straight surface of the second level segment.

19. The level of claim 10 wherein each level segment has a rectangular cross-section and straight faces on top, bottom, and lateral exterior surfaces.

20. The level of claim 10 wherein permanent magnets are located on at least one lateral exterior surface of the first level segment, and at least one lateral exterior surface of the second level segment, the magnets being disposed on the lateral exterior surfaces such that when a first lateral exterior surface of a first level segment is placed opposite a first lateral exterior surface of a second level segment, the magnetics poles of the magnets attract and hold the two exterior surface together, thereby forming a magnetic storage means.

21. The level of claim 10 comprising a lateral exterior surface in a level segment and a storage compartment is disposed in the lateral exterior surface, the storage compartment comprising a recess and a movable door that can open so as to provide access to the recess.

* * * * *